(12) United States Patent
Gagas et al.

(10) Patent No.: US 7,798,139 B2
(45) Date of Patent: Sep. 21, 2010

(54) MODULAR PORTABLE GRILL

(75) Inventors: John M. Gagas, Milwaukee, WI (US); Peter F. Sosso, Hustisford, WI (US)

(73) Assignee: Western Industries, Inc., Watertown, WI (US)

( * ) Notice: Subject to any disclaimer, the term of this patent is extended or adjusted under 35 U.S.C. 154(b) by 149 days.

(21) Appl. No.: 11/462,192

(22) Filed: Aug. 3, 2006

(65) Prior Publication Data

US 2007/0028912 A1 Feb. 8, 2007

Related U.S. Application Data

(60) Provisional application No. 60/705,150, filed on Aug. 3, 2005.

(51) Int. Cl.
*A47J 37/00* (2006.01)
(52) U.S. Cl. .......... 126/25 R; 126/19.5; 126/1 R; 126/39 R; 126/39 BA
(58) Field of Classification Search ............. 126/19.5, 126/1 R, 25 R, 38 R, 39 BA, 39 R
See application file for complete search history.

(56) References Cited

U.S. PATENT DOCUMENTS

| | | | | |
|---|---|---|---|---|
| 2,304,140 A | * | 12/1942 | Bergholm ............. 126/39 G |
| 3,385,282 A | * | 5/1968 | Lloyd .................. 44/522 |
| 3,971,308 A | * | 7/1976 | Parker ................. 99/467 |
| 3,982,476 A | * | 9/1976 | McLane ............... 99/339 |
| 3,991,666 A | * | 11/1976 | Tidwell et al. ......... 99/446 |
| 4,125,357 A | * | 11/1978 | Kristen et al. ......... 431/78 |
| 4,321,857 A | | 3/1982 | Best |
| 4,413,610 A | * | 11/1983 | Berlik ................. 126/39 K |
| 4,474,107 A | * | 10/1984 | Cothran ............... 99/352 |
| 4,492,215 A | | 1/1985 | DiGianvittorio |
| 4,492,336 A | * | 1/1985 | Takata et al. .......... 236/20 A |
| 4,516,485 A | * | 5/1985 | Miller ................. 99/339 |
| 4,667,652 A | | 5/1987 | Bunton |
| 4,677,964 A | * | 7/1987 | Lohmeyer et al. ...... 126/41 R |
| 4,697,506 A | | 10/1987 | Ducate, Jr. |
| 4,727,853 A | * | 3/1988 | Stephen et al. ......... 126/41 R |
| 4,757,756 A | * | 7/1988 | Van Marr ............. 99/482 |
| 4,773,319 A | | 9/1988 | Holland |
| 4,819,614 A | * | 4/1989 | Hitch ................. 126/36 |
| 4,840,118 A | | 6/1989 | Rinehart |
| 4,869,228 A | | 9/1989 | Sorensen |
| 4,969,449 A | * | 11/1990 | Levin ................. 126/332 |
| 5,003,960 A | * | 4/1991 | Hanagan .............. 126/39 BA |

(Continued)

*Primary Examiner*—Kenneth B Rinehart
*Assistant Examiner*—Jorge Pereiro
(74) *Attorney, Agent, or Firm*—Boyle Fredrickson, S.C.

(57) ABSTRACT

A modular portable gas grill including an energy management system for even temperature control, enhanced flavor devices, and electronic, electro-mechanical, or mechanical controls is provided. The grill includes a touch control system including sliders or knobs providing efficient, precise and accurate control. Heat and flame deflecting shields provide an improved air draft, heat, and flavoring system and can be removed for cleaning. Modular design construction and a quick-connect gas manifold permit the addition of additional components at a later date such as a rotisserie, and a smoke chute for flavoring. Burner shields protect the burner and flame from greases and liquids. The grill also features the ability to easily convert between propane and natural gas fuel and an electronic reigniting system providing individualized control to the burners. The grill also features a dual fuel mode giving a user the ability to use propane or natural gas along with charcoal or other solid fuel.

20 Claims, 13 Drawing Sheets

U.S. PATENT DOCUMENTS

| | | | |
|---|---|---|---|
| 5,033,449 A * | 7/1991 | Hanagan | 126/39 BA |
| 5,042,451 A | 8/1991 | Beller | |
| 5,044,266 A * | 9/1991 | Geogaris | 99/446 |
| 5,056,364 A * | 10/1991 | Kahler et al. | 73/296 |
| 5,104,080 A | 4/1992 | Berger | |
| 5,111,803 A * | 5/1992 | Barker et al. | 126/41 R |
| 5,176,067 A | 1/1993 | Higgins | |
| 5,211,105 A * | 5/1993 | Liu | 99/446 |
| 5,253,634 A | 10/1993 | LeBeouf | |
| 5,321,229 A * | 6/1994 | Holling et al. | 219/445.1 |
| 5,355,868 A * | 10/1994 | Haen | 126/41 R |
| 5,368,009 A * | 11/1994 | Jones | 126/41 R |
| 5,410,948 A | 5/1995 | Eickmeyer | |
| 5,481,965 A * | 1/1996 | Kronman | 99/340 |
| 5,536,518 A * | 7/1996 | Rummel | 426/523 |
| 5,560,349 A * | 10/1996 | Lucero | 126/41 R |
| 5,605,142 A * | 2/1997 | Parker | 126/9 B |
| 5,617,840 A | 4/1997 | Clifford | |
| 5,645,042 A | 7/1997 | Tompkins, Jr. | |
| 5,694,917 A | 12/1997 | Giebel et al. | |
| 5,711,663 A | 1/1998 | Giebel et al. | |
| 5,755,154 A * | 5/1998 | Schroeter et al. | 99/401 |
| 5,806,412 A | 9/1998 | Bedford et al. | |
| 5,813,394 A * | 9/1998 | Clifford | 126/41 R |
| 5,865,164 A * | 2/1999 | Garceau et al. | 126/39 G |
| 5,878,739 A * | 3/1999 | Guidry | 126/25 R |
| 5,937,847 A * | 8/1999 | Garceau et al. | 126/39 H |
| 5,960,782 A | 10/1999 | Clements et al. | |
| 5,970,855 A | 10/1999 | Patterson et al. | |
| 5,975,072 A * | 11/1999 | Garceau et al. | 126/39 G |
| 5,983,882 A | 11/1999 | Ceravolo | |
| 5,988,155 A * | 11/1999 | Garceau et al. | 126/39 G |
| 5,996,572 A * | 12/1999 | Ilagan | 126/25 AA |
| 6,038,964 A * | 3/2000 | Sikes | 99/340 |
| 6,039,039 A * | 3/2000 | Pina, Jr. | 126/25 R |
| 6,041,769 A | 3/2000 | Llodra, Jr. et al. | |
| 6,095,130 A | 8/2000 | Faraj | |
| 6,102,028 A | 8/2000 | Schlosser et al. | |
| 6,102,029 A * | 8/2000 | Stephen et al. | 126/41 R |
| 6,125,837 A | 10/2000 | Mulberry | |
| 6,131,562 A | 10/2000 | Schlosser et al. | |
| 6,133,554 A * | 10/2000 | Clifford | 219/494 |
| 6,148,668 A | 11/2000 | Sieg | |
| 6,155,160 A * | 12/2000 | Hochbrueckner | 99/331 |
| 6,176,173 B1 * | 1/2001 | Holbrook et al. | 99/401 |
| 6,202,640 B1 * | 3/2001 | Naperola et al. | 126/41 R |
| 6,205,996 B1 * | 3/2001 | Ryan | 126/41 R |
| 6,230,700 B1 * | 5/2001 | Daniels et al. | 126/25 R |
| 6,273,922 B1 * | 8/2001 | Funk et al. | 44/577 |
| 6,279,566 B1 * | 8/2001 | Craven, Jr. | 126/41 R |
| 6,283,114 B1 | 9/2001 | Giebel et al. | |
| 6,293,272 B1 | 9/2001 | Harneit | |
| 6,293,276 B1 | 9/2001 | Owens et al. | |
| 6,308,616 B1 | 10/2001 | Johnson | |
| 6,314,868 B1 * | 11/2001 | Christensen et al. | 99/340 |
| 6,314,871 B1 * | 11/2001 | Holbrook et al. | 99/401 |
| 6,343,545 B1 | 2/2002 | Patterson et al. | |
| 6,357,344 B2 * | 3/2002 | O'Grady et al. | 99/340 |
| D462,564 S | 9/2002 | Brake et al. | |
| 6,559,427 B1 * | 5/2003 | Barnes et al. | 219/486 |
| 6,561,179 B1 | 5/2003 | Brake et al. | |
| 6,581,587 B1 | 6/2003 | Helms | |
| 6,595,197 B1 * | 7/2003 | Ganard | 126/25 R |
| 6,619,600 B1 | 9/2003 | Johnson et al. | |
| 6,666,563 B2 | 12/2003 | Brown | |
| 6,691,700 B2 | 2/2004 | Kahler et al. | |
| 6,705,307 B2 | 3/2004 | Alden et al. | |
| 6,736,050 B1 * | 5/2004 | Monn | 99/339 |
| 6,742,513 B1 * | 6/2004 | Ball et al. | 126/25 R |
| 6,748,940 B2 * | 6/2004 | Bennett et al. | 126/41 R |
| 6,755,187 B2 | 6/2004 | Harrod et al. | |
| 6,755,188 B2 | 6/2004 | Skidmore et al. | |
| 6,782,805 B2 | 8/2004 | Backus et al. | |
| 6,793,199 B2 | 9/2004 | Bushik et al. | |
| 6,805,113 B2 | 10/2004 | Stephen et al. | |
| 6,805,114 B2 | 10/2004 | Outten et al. | |
| 6,814,383 B2 * | 11/2004 | Reed et al. | 296/24.3 |
| 6,818,869 B2 * | 11/2004 | Patti et al. | 219/489 |
| 6,837,150 B2 | 1/2005 | Backus et al. | |
| 6,874,408 B2 | 4/2005 | Backus et al. | |
| 6,883,512 B2 | 4/2005 | Esposito | |
| 6,925,998 B2 * | 8/2005 | Bruno et al. | 126/41 R |
| 6,945,160 B2 * | 9/2005 | Christensen et al. | 99/447 |
| 7,066,169 B2 * | 6/2006 | Feldewerth et al. | 126/41 R |
| 7,082,941 B2 * | 8/2006 | Jones et al. | 126/39 H |
| 7,575,000 B2 * | 8/2009 | Jones et al. | 126/39 H |
| 2002/0045142 A1 | 4/2002 | Repper et al. | 431/66 |
| 2002/0117165 A1 * | 8/2002 | Turner | 126/299 R |
| 2003/0015188 A1 * | 1/2003 | Harbin | 126/25 R |
| 2003/0024525 A1 * | 2/2003 | Jennings | 126/39 R |
| 2003/0041744 A1 * | 3/2003 | Stephen et al. | 99/450 |
| 2003/0047553 A1 * | 3/2003 | Patti et al. | 219/400 |
| 2003/0213484 A1 * | 11/2003 | Alden et al. | 126/41 R |
| 2003/0217647 A1 * | 11/2003 | Jones | 99/450 |
| 2004/0112363 A1 * | 6/2004 | Speck et al. | 126/41 R |
| 2005/0000957 A1 * | 1/2005 | Jones et al. | 219/450.1 |
| 2005/0089809 A9 * | 4/2005 | Repper et al. | 431/66 |
| 2005/0092188 A1 * | 5/2005 | Huegerich et al. | 99/421 R |
| 2006/0201495 A1 * | 9/2006 | Jones et al. | 126/25 R |

* cited by examiner

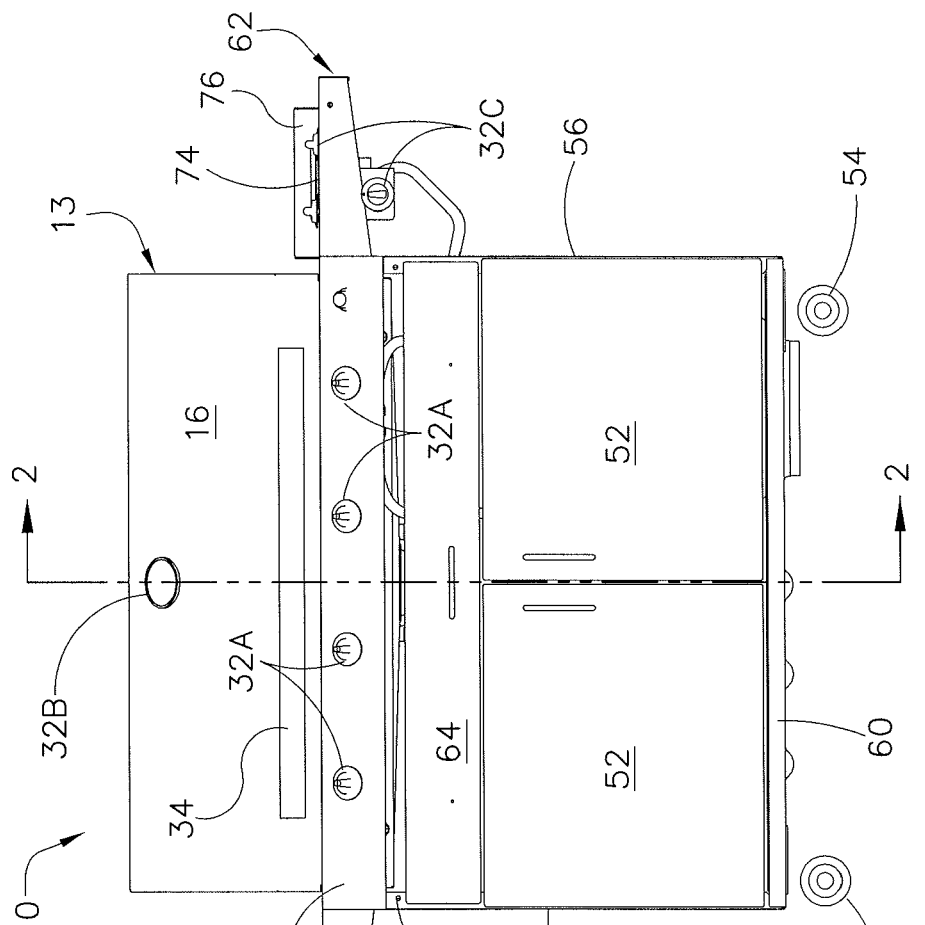
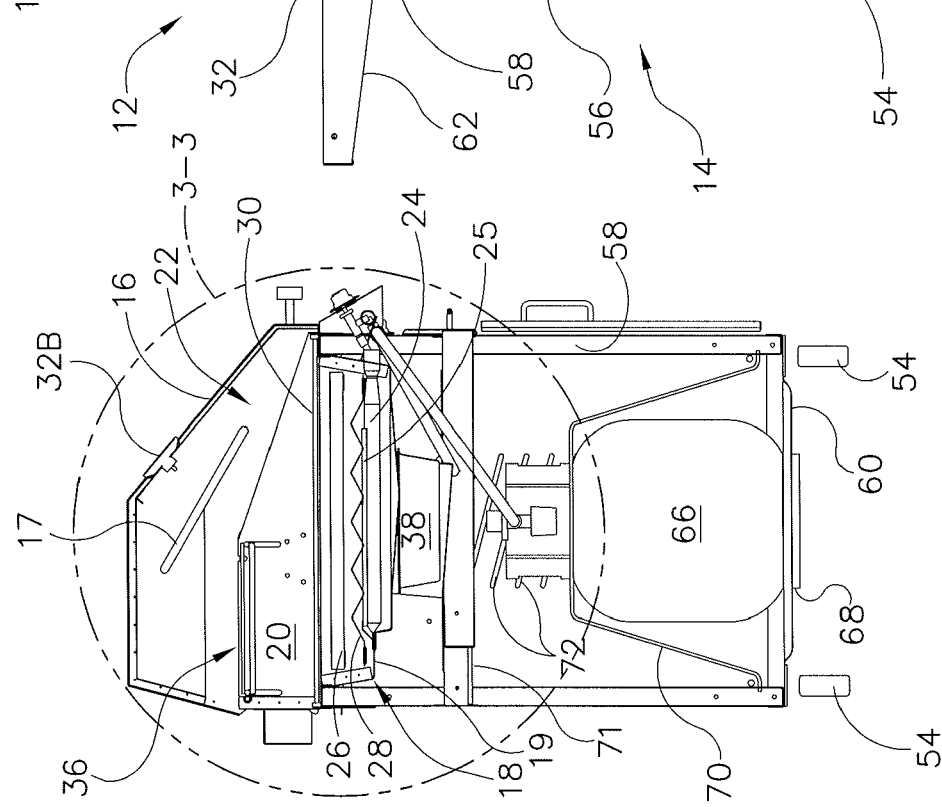

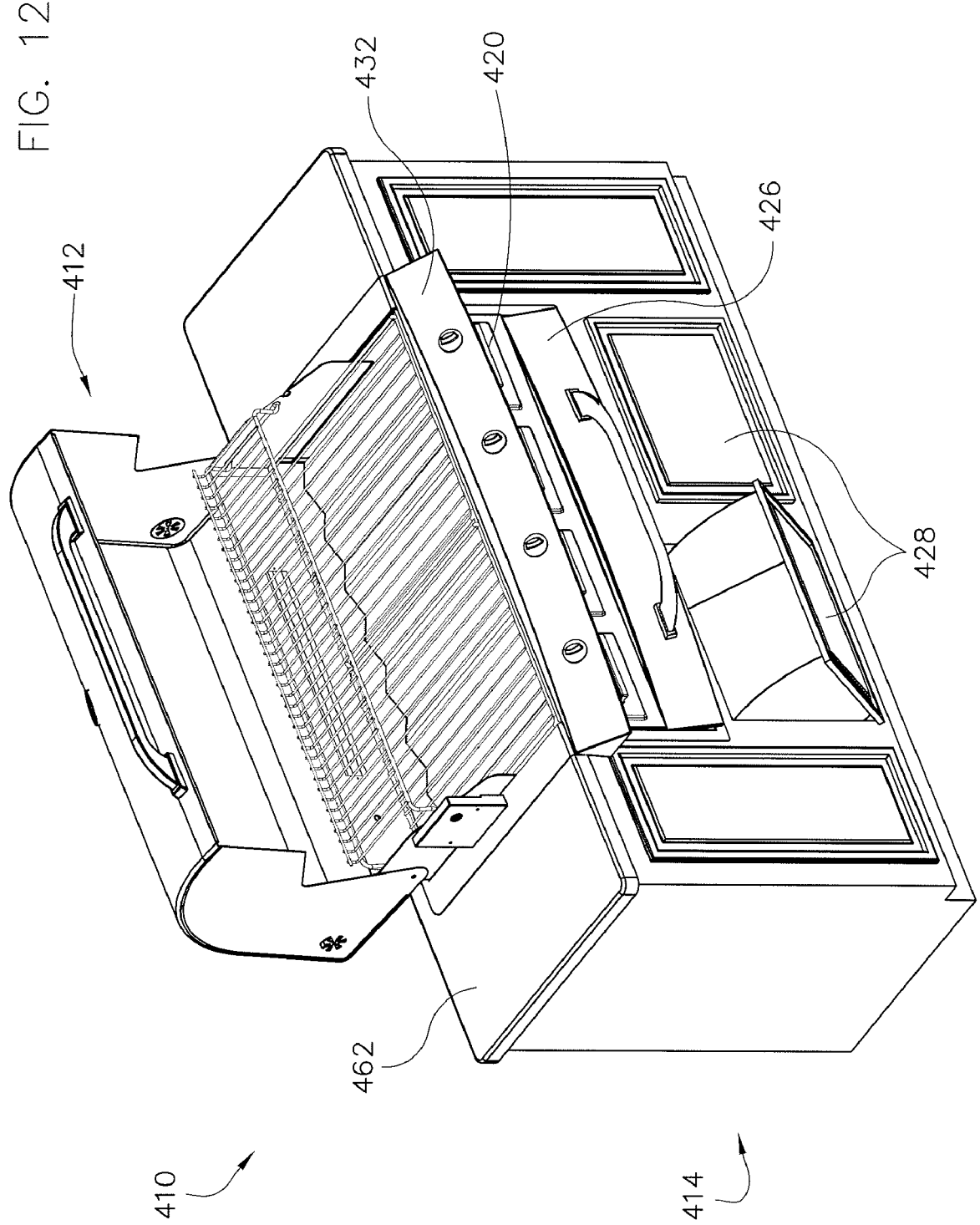

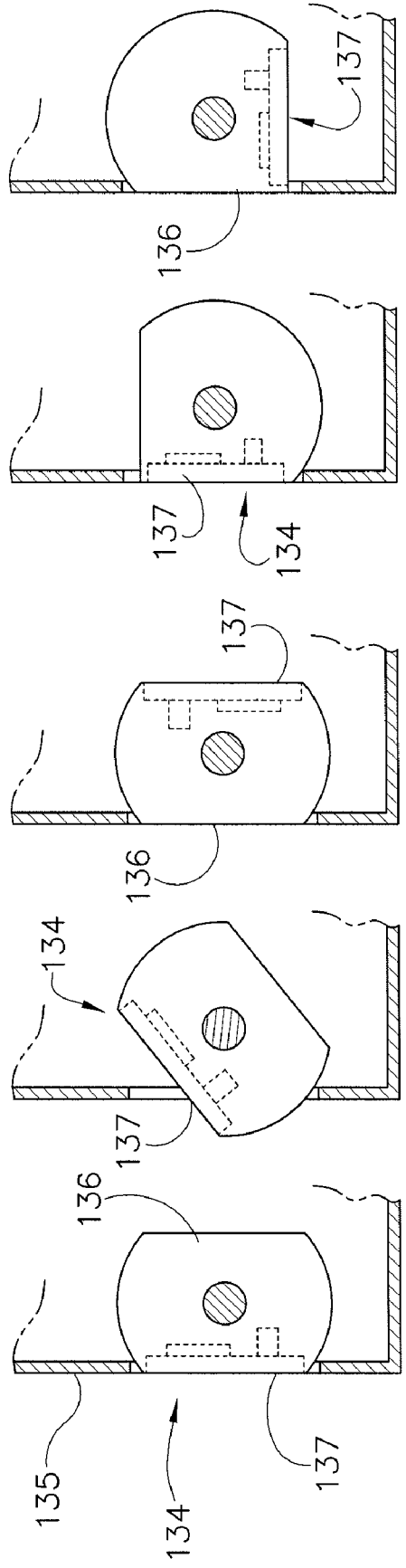

MODULAR PORTABLE GRILL

CROSS REFERENCE TO RELATED APPLICATIONS

This application claims the benefit of U.S. Provisional Application No. 60/705,150, entitled "Modular Portable Grill", filed Aug. 3, 2005.

FIELD OF THE INVENTION

The present invention relates to a single or dual fuel grill and more particularly to a modular portable single or dual fuel grill.

BACKGROUND OF THE INVENTION

Outdoor grills are well-known. In fact, grilling out has become increasingly popular in recent years. Over the years, there have been numerous improvements made to grills.

There are two basic types of outdoor grills—charcoal barbecue and gas grills. Gas grills offer a major advantage of less preparation time because the gas is instantaneously available. Generally, gas barbecue grills consist of a frame or support structure and a cooking chamber. Grills can be configured to hold or support the heating elements and a fuel tank on the side or inside a cabinet. Gas grills have a burner element adjacent to the lower portion of the chamber with a cooking surface near the top of the chamber. Gas grills almost universally have a hood or cover which can be lifted up or pivoted to permit access to the cooking surface. There can also be an auxiliary cooking element located inside or on the side of the grill for cooking.

Many older types of charcoal grills produce smoke, steam, or other gaseous byproducts because they use charcoal. This is considered beneficial as it provides great flavor to the food. Often, in other grills, it is considered beneficial to incorporate some type of flavoring system to utilize and enhance the airborne smoke, such as a racking system. However, there are a number of drawbacks in using charcoal grills. One drawback is the increased potential for flaming up due to greases, oils, and similar flammable liquids dripping onto the hot coals. Furthermore, there typically is a long startup process as well as longer operating times needed to properly cook on these grills. Finally, charcoal does not provide adequate heat control.

Modern gas grills may overcome some of the problems with charcoal grills but have their own set of drawbacks. For example, most existing gas grills take the form of an oven which holds the heat and flame below a cooking surface and can be selectively activated to cook certain areas in a long line. This entrapment of heat provides for an even distribution of heat like an oven, but this heat trapping only produces radiant heat for cooking. Some gas grill manufacturers put a single plate with various-sized holes underneath the cooking surface but this method just causes heat to concentrate near the larger holes. This design, with the different sized holes results in a least-resistance system of heating. In essence, the heat goes through the large holes unhindered but is limited when trying to go through the small holes. The result is hot spots on the cooking surface and therefore uneven cooking.

The below-referenced U.S. patents, disclose embodiments that were at least, in part, satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

U.S. Pat. No. 6,314,871 entitled "Cooking Appliance with Improved Heat Distribution" describes a sear grid that has an undulating shape located between the burner and the cooking grid and a panel that has radius peaks to allow liquids to run off and be heated. This plate has only limited holes at the bottom for draining and at the other edge for heat to rise to the cooking surface. This single plate design results in basically an oven environment, which does not permit flavoring of the items being cooked, nor does it offer any method for ease of use or cleaning.

U.S. Pat. No. 5,806,412 entitled "Gas Cooking Apparatus" provides a single sheet baffle inside the grill combustion chamber and a plurality of various size openings for controlling combustion gas travel and evenly distributing heat.

Cooking arrangements for long gas burners are also widely known in the art. A cooking surface is incorporated into an opening that is positioned between different sections of the cooking surface or extends along the back underside of the cooking surface. This type of heating element has several known problems. One problem is that if not protected from above, grease and other liquids may fall on to the burner, where the heat and flame burn the grease causing a flare up. This burning also causes a buildup of carbon and burned grease residue on the burner to the point that they will fail to operate over time.

There are several other problems that may arise when using long-type burners. For example, spiders, insects or other debris may get into the burners and inhibit proper operation. To provide a uniform heat distribution, grill manufacturers have placed lava rocks between the cooking surface and the burner elements to act as a conductive component, absorbing and radiating heat to the cooking surface. However, the pores of lava rocks trap fluids and food creating an unsanitary condition with a potential for insects and bacteria. Furthermore, the accumulated buildup of grease, food and charred items can block the passage of heat. Some manufacturers have attempted to solve this problem by using bricks instead of lava rocks to control the heat and temperature, but have encountered many of the same problems as with lava rocks.

In some gas grill designs, such as those mentioned above, plates are arranged between the cooking surface and burners to prevent flare-ups and material buildup on the burners. However, these plates effectively function as shields by stopping all direct flame and heat contact with the food on the cooking surface. Furthermore, these plates prevent any liquids from reaching the burner flame which is necessary to produce the smoking flavor effect. Manufacturers have attempted to solve the shielding and lack of flavor problems in different ways. Weber-Stephen Products Company was the first to place inverted V plates, i.e., "flavor bars", in two layers. These inverted V plates direct fluids away from the heating elements but typically become very hot. This, in turn, causes liquids to sizzle and evaporate rapidly upon contact with the flavor bars and end up leaving behind a buildup. Also, these flavor bars were not designed for any kind of cleaning. Instead, they must be removed and replaced when they no longer function properly. Other manufacturers have utilized plates to capture heat while blocking fluids from reaching the heating elements. The result is that the grill is essentially turned into an oven, but is still called a grill. In fact, many grill manufacturers describe their grills as an "oven like environment".

Depending on factors such as the food to be cooked and the height of the particular individual who is cooking, it may be desirable to vary the distance between the cooking surface and the burners. However, in a typical gas grill, the vertical distance between the cooking surface and gas burners is fixed. For some foods, it is considered beneficial to be able to arrange a burner closer to the cooking surface to increase the heating and cooking speed, especially when searing foods. Another benefit of lowering a cooking surface relative to the heat source is to more easily control different portions of the cooking surface to achieve hotter temperatures. However, with the typical gas grill, there is no way to safely or easily adjust the cooking surface, and therefore the cooking temperature. Instead, these gas grills utilize higher BTU heating sources to compensate for the lack of height adjustability.

An additional problem with existing gas grills is that the typical large and long heating elements provide limited control of surface temperatures. One approach taken to solve this problem was to add more elements. However, these U-shaped elements, long single burner elements, and four- or five-element arrangements are not being used to control heat and surface temperatures. Instead, these elements provide a large area of heating and a large temperature rise from the output of the element. The heating elements are controlled through the use of a valve and knob supplying gas to the heating elements. At low temperature settings, the flame may be so small that just a small amount of air movement causes the flame to go out. The ideal temperature setting for this style of grill is somewhere in the mid-range. At high temperature settings, it has been noted that on some grills, the large demand for gas has turned off the gas supply by activating the tank safety valve. While this is a beneficial tank safety feature, some users are forced to look at other methods for fueling their grill.

Another problem with gas barbecue grills is the ability of a typical user to properly assemble the grill. Poor installation instructions coupled with long assembly times contribute to this problem. One typical design of a gas grill has a frame and components fastened only with screws that if improperly installed, can cause structural weaknesses. Furthermore, over time, even properly installed fasteners can rust and lose holding power with the result being weakened grills that may eventually fall apart. Recently, stainless steel grills have become a popular alternative. Stainless steel grills provide the look and design of grills made by other materials. However, stainless steel grill components are sometimes difficult to assemble due to the hardness of the metal causing screws to not attach properly or to strip the threads of the screw or hole.

Another problem with present grills is the inability to add features to them at a later time. This is especially a problem with high-end units. For example, if a consumer does not have enough money to purchase a high-end unit, he must either wait or purchase a unit with less functionality and features.

Existing rotisserie systems for gas grills have a number of problems. For example, if an uneven load is placed on the rotisserie shaft, the item may cook unevenly or the motor may stall. Furthermore, the uneven load may cause the motor to run faster if the load is rotating downwards and slower if the load rotating upwards. This obviously creates problems with food quality as well as problems with the motor including popping off the assembly or lifting off the attachment points on the grill.

A still further problem with current gas grills is with the burner ignition system. Currently, in a low gas setting, the burner flames may be blown out with no indication of this to the user. Furthermore, when lighting a grill, the igniters continually fire sparks until the burner elements are lit. Sometimes, the lighting does not occur for several seconds allowing a buildup of gas. Once the burner is lit, the buildup of gas ignites causing the user to see and feel a bang.

A further problem with a grill having large burners or one that produces high BTUs, is that a standard tank of propane ("LP") does not last for very long. Therefore, a user must purchase spare LP tanks or find another method of providing fuel to their large grill. However, there currently is no kit that can easily change a grill from LP to natural gas. A further problem exists in that no present grill accurately monitors the amount of fuel left in the tank and notifies the user accordingly. Mechanical methods have been used to show the weight of the tank, but tanks differ in weight from manufacturer to manufacturer so these methods are inherently inaccurate. Further, some grills have shut off valves and regulators inline with the tank while others have this equipment separate. There exists a need for an accurate method of detecting the level of fuel and displaying that level along with a calculated cook time remaining.

A further problem with present grills involves the collection of ash, grease and other drippings in special collection trays. Replacement trays are not readily available in stores and typically only available directly from grill manufacturers. A user must presently blindly clean out these trays because there is no indication when they are filled. The typical tray is located at a collection point at the bottom of the chamber. The ash, grease and other drippings remain in the pan indefinitely until it is clear it is filled, e.g., by overflowing.

Therefore, there exists a need for a gas grill that overcomes the aforementioned problems with present grills. A need exists for a grill with an integrated energy/flavor system using round burners having a porcelain or stainless steel protection system providing an accurate temperature control, proper venting and air flow, an improved rotisserie system, having the ability to be cleaned, and modular in design. There exists the need for a grill capable of having precise control of the grill functions, including temperatures, and zones. There exists a need for a grill with a shallower profile for improved heat extraction to the cooking chamber. There exists a need for a grill giving a user the ability to see and retrieve the contents in the cook top. There exists a need for a grill with a modular base unit design wherein additional features can be added at a later time. There also exists a need for a grill having an innovative rotisserie design.

SUMMARY OF THE INVENTION

An advantage of the present invention is providing an improved modular portable gas grill that attempts to solve the problems detailed above by incorporating one or more of the characteristics discussed in the embodiments listed below.

A first embodiment of the improved modular portable grill is comprised of an enclosure defining a cooking chamber, a cooking surface, a heating system, a monitoring system, at least two perforated corrugated deflector plates, or heat and flame shields located between the heating system and the cooking surface, a controller connected to the heating system and the monitoring system; and a user interface connected to the controller. Preferably, the enclosure makes contact with the sides of the perforated corrugated plates thereby providing a seal to force heated air through holes in the alternating arrangement of perforated corrugated plates.

The inventive grill can be integrated into a cabinet, counter, island, wall or mobile unit either indoors or outdoors. The grill may further have an exhaust blower system, especially for indoor operation. The grill may further comprise a fan providing air movement for an even cooking temperature, faster cooking time and smoke circulation.

The grill heating system may consist of a number of burner elements. Each burner element preferably has a separate flame sensor and electronic spark igniter. The controller for the grill may detect current, voltage or resistance while the electronic spark igniters are igniting the burner elements. The controller may direct an electronic spark igniter to reignite a burner element if the corresponding flame sensor detects a lack of a flame.

The user interface can be, for example, a temperature control knob, the position of which is measured by a position detection sensor, wherein the sensor detects the position of the knob for precise control. The user interface may also be an electronic touch control with grill controls provided by tactile, membrane, piezo, capacitance, resistance-type, induction, and keypad devices. The electronic touch control may be installed on the grill in at least one of the following manners: flush, raised, recessed, hidden and in a pop-up unit. The user interface may be incorporated as part of a remote control.

The controller may be a microelectronic controller providing set temperature control, timed on/off control and zone temperature control. The controller may be located remotely from the grill to help protect the electronics. The controller may divide the grill into individual heating zones for zone temperature monitoring and control. These zones may have separate temperature sensors tied into the monitoring system. The user interface may display the desired and actual zone temperatures, the desired zone temperatures being selectable and adjustable.

The grill may also receive various modular components including, but not limited to: a smoke chute, a side burner, a rotisserie unit, lighting, sear burner and an infrared (IR) burner. The rotisserie unit preferably has a motor that turns a rack at a constant speed even when an uneven load is placed on the rack. The grill preferably has a quick-connect system for ease of installing and removing the various modular components. The smoke chute directs smoke into the cooking chamber to add flavor.

A second embodiment of an improved modular portable grill comprises a housing defining a cooking chamber, a plurality of burners, a cooking surface connected to the housing, a user interface connected to the cooking surface, burner shields to protect the burners, and a flame shield to protect food on the cooking surface by limiting flare-ups. The flame shield preferably is comprised of a bottom perforated corrugated plate and a top perforated corrugated plate layered and arranged in an alternating fashion so as to limit air flow through perforations. The plates may act as heat sinks to lessen heat recovery time after a grill has been opened and closed again.

The grill's burner and flame shields are removable and may be cleaned in a dishwasher, in a self-cleaning oven or washed by hand. Preferably, the shields are made out of stainless steel or porcelain.

The grill may have a fuel supply system that has the ability to deliver either propane or natural gas. The grill may also have a warming drawer that is heated through radiant heat from the grill.

A third embodiment of an improved modular portable grill comprises an enclosure defining a cooking chamber. The grill further includes a cooking surface, a heating system, at least two perforated corrugated plates arranged in an alternating manner located between the cooking surface and the heating system and at least one sensor connected to the cooking chamber or heating system for monitoring temperature, resistance or presence of flame. A ventilation system may also be provided that comprises a fan connected to the cooking chamber. A user interface that accepts user settings and displays grill parameters and an electronic control system engaged with the heating system, sensors, ventilation system and user interface may also be present.

An advantage of the present invention is providing an improved indoor or outdoor, portable gas barbecue grill having flame heat, modular construction, an energy management system for even temperature control and enhanced flavor and electronic, electro-mechanical controls. Further advantages of the present invention include a touch system, slide(s), or knob(s), providing more precise control and an efficient way of cooking over most present gas units on the market. Even further advantages include state-of-the-art heat and flame perforated corrugated or deflecting shields that can be easily removed for cleaning, modular components to add extra features later, burner shields to protect the burners and flames from grease and other drippings, an improved rotisserie system, the ability to convert to either LP or natural gas for fuel, the use of charcoal with either one of the gases or by itself, a quick connect system for attachment of other features, smoke tray for flavoring food being cooked, and a burner reigniting system.

Other embodiments of the grill of the present invention have the ability to add on components as the user needs. This enables a user to purchase a base grill unit and then add on modular features such as: a side burner, IR burners for searing (bottom) or rotisserie (back wall) a burner for the top for grilling from two directions, lighting, larger heating elements, and a smoke chute provides this modular innovative grill with the flexibility not found in any grill on the market.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which FIGS. 1-15 illustrate various views of embodiments of the present invention.

FIG. 1 is a front view of a first embodiment of a grill constructed in accordance with the present invention;

FIG. 2 is a cross sectional view of the grill of FIG. 1 taken along lines 2-2;

FIG. 3 is an enlarged fragmentary cross sectional view of the grill of FIG. 2;

FIG. 4 is an exploded perspective view of a second embodiment of a grill constructed in accordance with the present invention;

FIG. 5 is a front view of the grill of FIG. 4 with the grill assembly removed and with wood trim added;

FIG. 6 is a schematic view of a fuel supply system for the grill of FIG. 4;

FIG. 7 is a side view of a burner of the fuel supply system of FIG. 6;

FIG. 8 is an exploded perspective view of a third embodiment of a grill constructed in accordance with the present invention;

FIG. 9 is a side view of a rotisserie system for a grill of the present invention;

FIG. 11 is an alternative embodiment of a grill of the present invention;

FIG. 12 is an alternative embodiment of a grill of the present invention;

FIGS. 13A-C are side views of a rotating user interface mechanism for a grill of the present invention;

FIGS. 14A-B are side views of a second rotating user interface mechanism for a grill of the present invention; and FIG. 15 is an alternative embodiment of a grill of the present invention.

Figure 3:
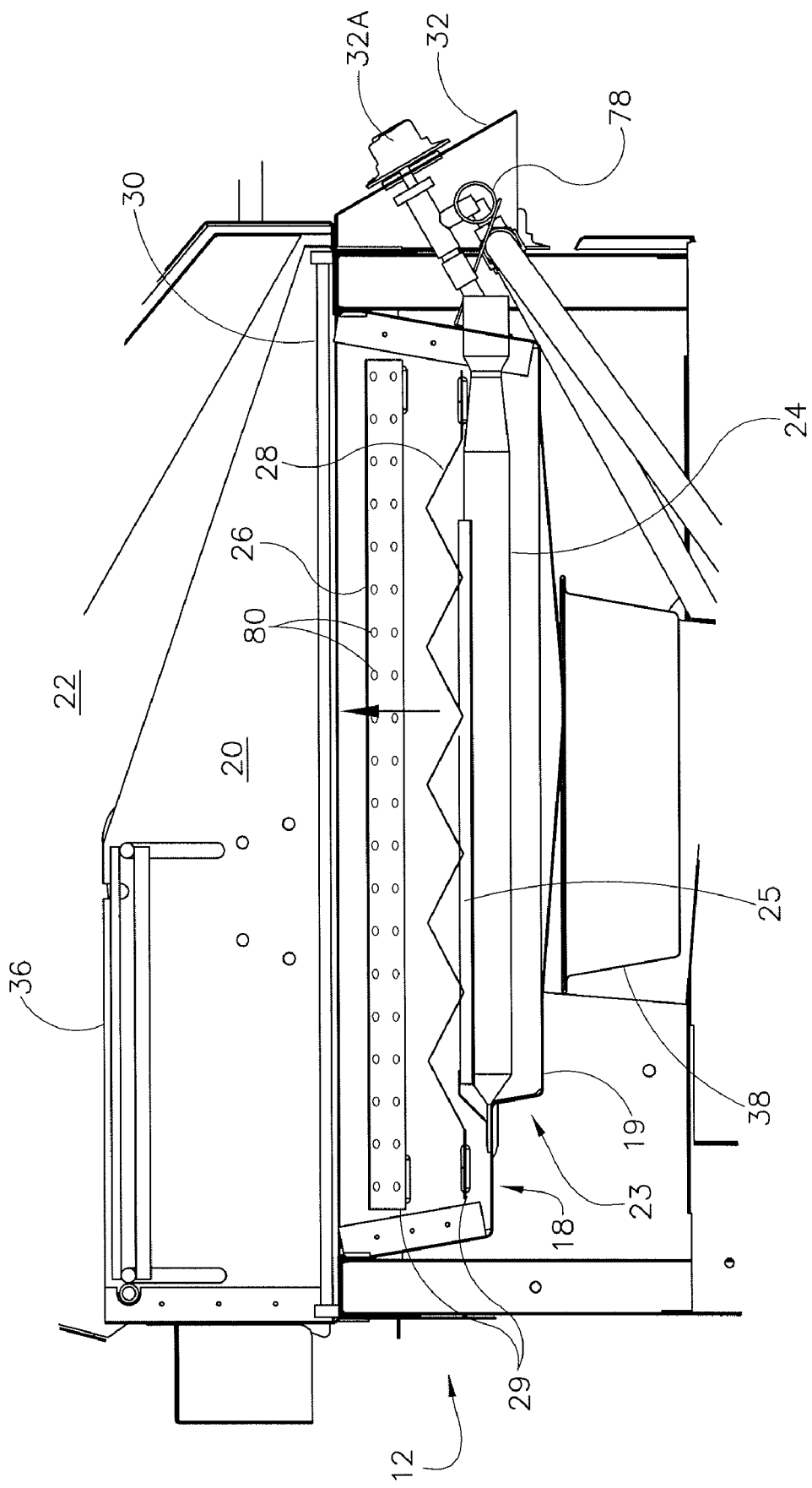

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected", "attached", or terms similar thereto are often used. They are not limited to direct connection but include connection through other elements where such connection is recognized as being equivalent by those skilled in the art.

DETAILED DESCRIPTION OF THE PREFERRED EMBODIMENTS

The present invention and the various features and advantageous details thereof are explained more fully with reference to the non-limiting embodiments described in detail in the following description.

System Overview

The present invention relates to preferably a gas barbecue grill, a gas barbecue, and a dual fuel grill having flame heat, an energy management system for even temperature control and enhanced flavor system with electronic, electro-mechanical, or mechanical controls.

Preferred embodiments of the grill are described as modular in that they have the ability to integrate numerous components added on to a base gas grill system. The grill can be used indoors or outdoors with minor modifications. The grill can be highly portable or built into a base housing or other appliance having a single to a plurality of heating elements located in the grill's chamber or on other surfaces. The grill can be used in combination with LP or natural-gas heating elements commonly found on appliances. The grill can use either LP or natural gas along with charcoal as a combined source or method of heating.

A touch control system, sliders or knobs may be provided for more precise control and a more efficient way of gas cooking over other grills. Heat and flame deflecting shields incorporated into the gas grill provide a better draft system and improve heat distribution and recovery. The preferred grill embodiments also incorporate and use modular design components so a user can add features at a later date The grill is preferably composed of a base grill chamber and base stand assembly. The base housing is attached to a grill chamber and base stand assembly. The base housing is attached to a grill housing or chamber or attached in a mobile unit or to some other surface. Alternatively, the grill can be permanently fixed in an island, countertop or cabinet. The grill housing is preferably of a low depth extending into the base mobile housing assembly and is attached to the frame. One embodiment of the invention incorporates a keypad and control circuit, which enables igniting and monitoring of the individual burners. The grill controls can be integrated into controls at the front, a keypad located on the side of the grill, remotely or parts of the keypad can be split between multiple locations. Similarly, the electronic controller can be located on the grill, remotely or parts of the controller can be split between the grill and other locations. The grill may also have an internal fan for moving air (i.e., a convection system), an improved spark igniting system, an energy management system for temperature and heat, heat/flame deflecting shields, which help reduce flare-ups, and an electronic igniter control with a control board to provide ignition to each individual element for lighting.

Various alternative embodiments and modifications to the invention will be made apparent to one of ordinary skill in the art by the following detailed description taken together with the drawings.

DETAILED DESCRIPTION OF PREFERRED EMBODIMENTS

Various embodiments of the grill of the present invention are shown in FIGS. 1-15, which are described in additional detail below. Each of these embodiments are configured from the same basic design concepts and like reference numerals refer to like components.

FIGS. 1-3 show one preferred embodiment of an appliance, such as a grill 10, made in accordance with the present invention. The grill 10 is preferably an indoor or outdoor modular constructed portable gas barbecue grill. The grill 10 comprises a modular grill assembly 12 attached to a base housing 14. The modular grill assembly 12 is preferably an enclosure 13 comprised of a cover 16, lower grill housing 18 and sides 20 defining a cooking chamber 22.

The grill assembly 12 is preferably further comprised of a heating system 23 comprising at least one burner element, or burner, 24, upper and lower perforated corrugated plates, or heat and flame deflector shields, 26, 28, cooking surface 30, and user interface 32. The user interface 32 is preferably comprised of burner control knobs 32A and a temperature gauge 32B. A handle 34 is provided on the cover 16 to access the cooking surface 30 and a warming shelf 36. Vents 17 are provided in the cover 16 for improved air flow. The bottom 19 of lower grill housing 18 is sloped to direct grease and other liquids into a grease tray 38.

As best shown in FIG. 3, the heat and flame shields 26, 28 preferably have a plurality of evenly spaced perforations, or holes, 80 and are mounted in an alternating arrangement between the burners 24 and the cooking surface 30. The bottom shield 28 is positioned 90° respective to the burners 24. The top shield 26 is positioned above the bottom shield 28 but rotated 90° in relation to the bottom shield 28. The alternating arrangement of the shields 26, 28 coupled with the spacing of the holes 80 provides even heating, improves heat airflow and reduces flare-ups. Edges 29 of the shields 26, 28 are in contact with the sides 20 of the lower grill housing 18 and form a seal, thereby forcing air through the holes 80. Because of the indirect air flow paths to the cooking surface 30, heat is presented at a controlled and stable rate. This also provides added flavor control. Furthermore, heat remains in the cooking chamber 22 longer because the shields 26, 28 retain heat. When the cover 16 is opened and closed, heat from the shields 26, 28 radiates into the cooking chamber 22 to quickly make up the lost heat. Additionally, flare-ups are reduced by the nature of the alternating arrangement of the shields 26, 28. When a flare-up does occur, the flame is limited as it must travel through the holes 80 in the alternating shields 26, 28.

Figure 4:
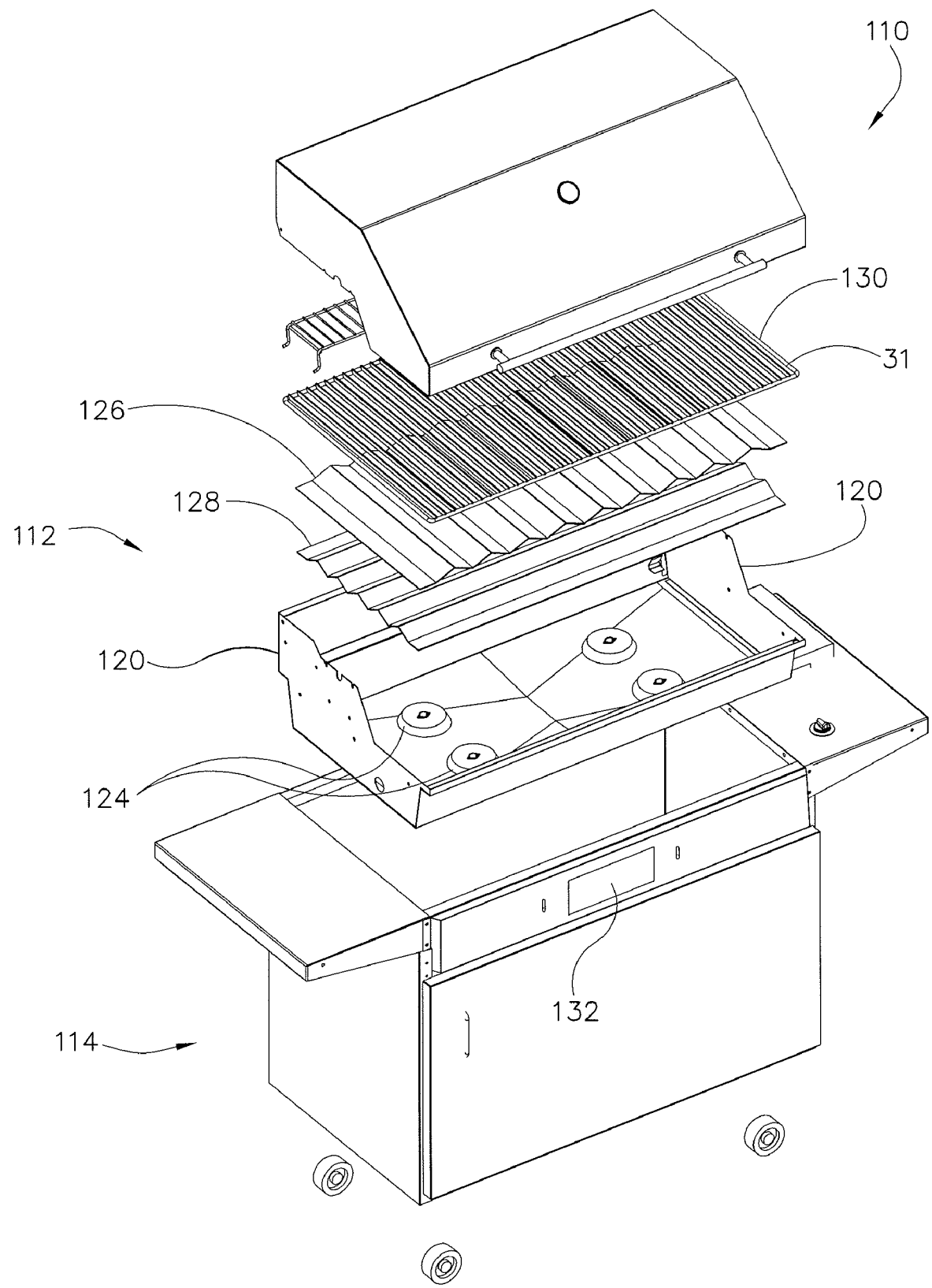

The cooking surface 30 preferably is a grate 31 made out of stainless steel or porcelain-coated steel (See FIG. 4). The cooking surface could also be a metal plate (not shown) with decorative or monogram openings laser cut from the plate. A veggie plate 231 (See FIG. 8) can be added and is discussed in more detail below. A warming shelf 36 is provided to keep items warm in the cooking chamber 22.

The grill 10 has long tube burners 24 although U- or similar-shaped burners could be used. The burners 24 are protected by burner shields 25. The burner shields 25 are large enough to protect the burners 24 yet thin enough to avoid shielding the flames. The burner shields 25 are removable and may be cleaned in a dishwasher, in a self-cleaning oven or by hand. The burner shields 25 extend the life of the burners 24 and increase their heating effectiveness by preventing drippings from reaching them. Adjustable burner control knobs 32A mechanically control the flow of gas to the burners 24.

The base housing 14 is comprised of at least one door 52, wheels 54, sides 56 attached to a frame 58, bottom plate 60, end caps 62 and warming drawer 64. A propane tank 66 is located in the base housing 14 and sits in a hole 68 in the base plate 60. A rod 70 further secures the tank 66. The rod 70 and tank 66 can be quickly and easily removed without tools. The base housing 14 can alternatively be constructed as a one-piece welded or single, bent sheet assembly. The base housing 14 has a heat shield 71 to protect the tank 66 from unsafe temperatures. Vent holes 72 are located in the sides 56 to permit the heat to escape. The sides 56 must be constructed with sufficient durability to handle the movement of heated air. A base housing 14 constructed with a frame 58 and sides 56 is less expensive than a base housing 14 constructed with a full-framed base housing 14.

The grill 10 preferably has a warming drawer 64 for keeping food warm. The warming drawer 64 is located in the base assembly under the lower grill housing 18. An exemplary warming drawer can be found and described in co-pending U.S. application Ser. No. 11/216,314 filed Aug. 31, 2005 and entitled "Warming Apparatus," the entirety of which is herein incorporated by reference. A side burner 74 can be added to the grill 10 by replacing one of the end caps 62 with the side burner 74. A cover 76 is provided to protect the side burner 74. Side burner control knobs 32C can be top-mounted or side-mounted. The quick-connect manifold system 78 aids in the assembly of the side burner 74. The quick-connect manifold system 78 also helps facilitate the addition of other modular components as discussed in further detail below.

FIGS. 4-7 show a second preferred embodiment of an appliance, such as a grill 110, made in accordance with the present invention. The grill 110 preferably has a user interface 132, e.g., electronic touch control interface 134, a monitoring system 160, e.g., a plurality of sensors, and a burner, or heating, system 170 all connected to an electronic controller 133 (See, e.g., FIG. 5). A standard AC or DC power supply preferably provides electricity to the controller 133, user interface 132 and other components. However, solar and/or battery power may be provided. The user interface 132 accepts inputs and displays grill parameters such as heat, temperature and cooking time remaining. The user interface 132 may be designed to match the designs from other appliances or products that have similar electronics. The user interface 132 may have a graphic display corresponding to the layout of the burners 124 or functionality of the grill 110. The user interface 132 and controller 133 provide users with better and more flexible control options than is possible with a strictly mechanically controlled grill. Therefore, the user can confidently modify the grill settings to achieve an optimum grilling experience.

The user interface 132, e.g., electronic touch control panel 134, could use a tactile, membrane, piezo, capacitance, resistance-type or induction-based interface, or keypad, as is widely known in the art. Various other switches, piezo, capacitance-, resistance- and inductive-type controls, if used, could be fitted with decorative overlays, underlays, labels, trim and completed control panel assemblies. The touch control panel 134 can be installed flush, raised, recessed, hidden or in a pop-up unit and installed on any surface. The touch control panel 134 can be made of metal, plastic or glass. The touch control 134 could incorporate LED, LCD, plasma, dot matrix, back lighting, or vacuum fluorescent displays in their design for improved control, design, look, and operation of the grill. Furthermore, the user interface 132 does not need to be placed on the grill 110 but instead can be placed on any remote surface. Remote interfacing with the grill 110 or controller 133 can be through a wired connection or by a wireless connection as is well known in the art.

Alternatively, the grill 110 can have a controller 133 but no electronic touch control 134. Instead, the user interface 132 would consist of standard burner control knobs 32A (FIG. 8) coupled with position detection sensors such as rotary encoders (not shown) to sense the desired burner setting and relay that into the controller 133. Alternatively, the grill 110 could have a user interface 132 incorporated into a remote control with display (not shown). The controller 133 and remote control (not shown) each would have a transmitter and receiver for bi-directional communications as is well known in the art. The remote control could receive and display information regarding the grill 110 while the controller 133 receives remotely entered commands.

The electronic controller 133 preferably is a microelectronic controller constructed from at least one of the following electronics including printed circuit boards (PCB)/integrated circuits (ICs), microprocessors, and other PC boards. The controller 133 used in the grill 110 could incorporate high heat construction design, specialized adhesive construction, loop resistant circuitry or ESD/EMI/RFI shielding into its design.

The controller 133 may provide functionality such as the ability to program or select temperature settings, setting cooking times, single- or multi-burner operation, or timed on/off control. Other functionality could be added such as the ability to have multi-function operation, zone temperature control, set temperature control, and any other functionality that may be provided for through programming and algorithms implemented by the controller 133.

Figure 5:
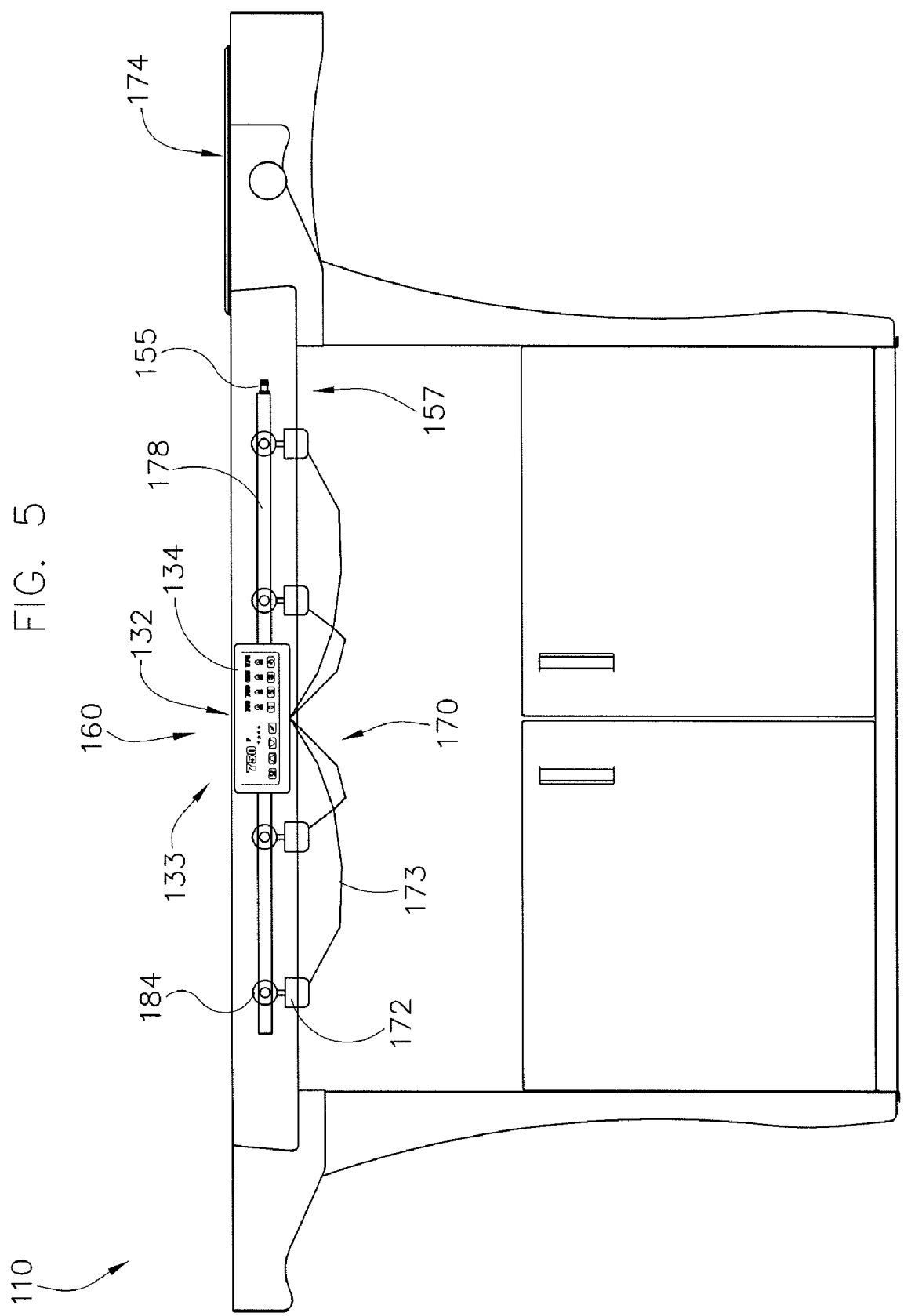
Figure 6:
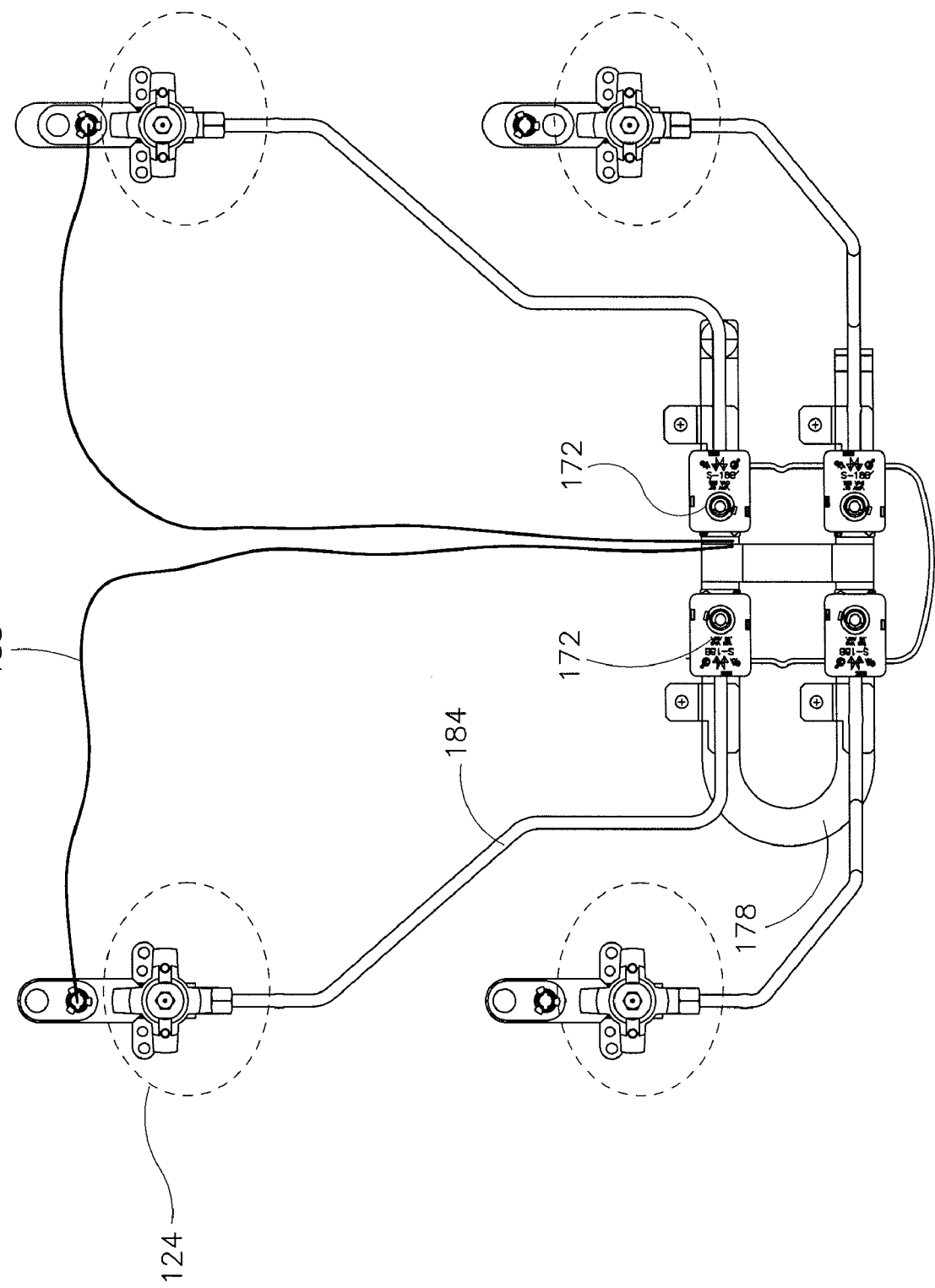
Figure 7:
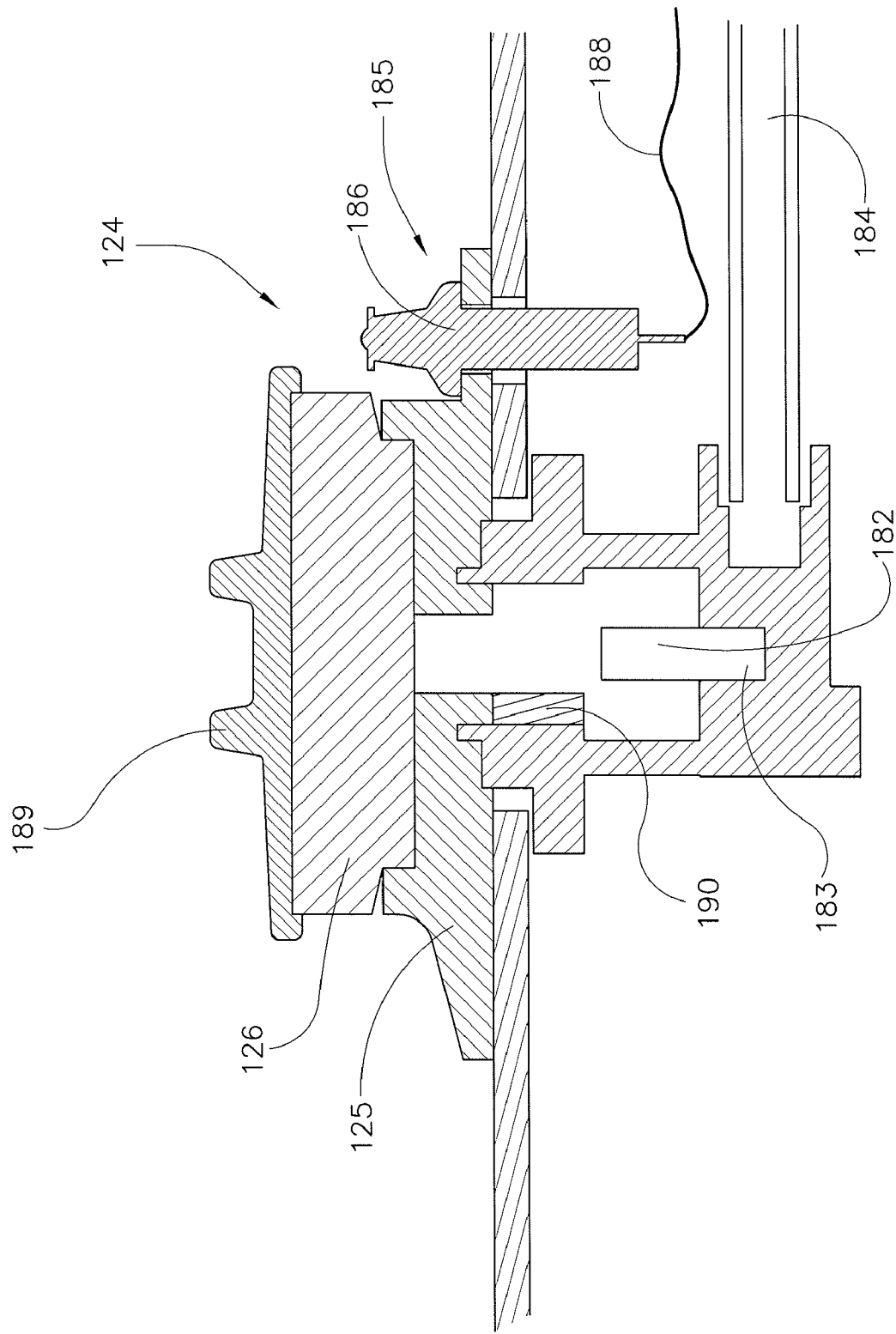

The grill 110 has an improved burner system 170 comprised of a quick-connect gas manifold 178, solenoids 172, and burners 124. FIG. 5 shows an electronically controlled burner system 170 in which electronic variable flow solenoids 172 enable gas flow to the burners 124 (FIG. 7). The solenoids are controlled by the controller 133 which in turn is connected to the user interface 132. FIG. 6 illustrates one layout for the burner system 170 including the burners 124 shown in phantom, wiring 188 and gas piping 184. FIG. 7 illustrates the components of a single round burner assembly 124. An igniter 185, e.g., electronic spark igniter 186, is shown along with the burner element 126 and porcelain protective cap 189. The use of a glow plug can be substituted for a spark igniter for lighting the gas. The porcelain cap 189 protects the burner element 126 from grease and other liquids and can be removed and cleaned. This extends the life of the burners 124 and therefore reduces the likelihood that a burner 124 would need to be replaced. A flame sensor 190 detects the presence, or absence, of a flame. An orifice spud 182 can be replaced with an orifice 183 for LP or natural gas depending on what fuel is being used. Both fuels can be used in conjunction with or without charcoal.

As seen in FIG. 5, the grill 110 can have a number of sensors comprising a monitoring system 160 providing feedback to the controller 133. The various sensors may comprise transducers disposed to sense certain operating parameters of the grill such as temperature, presence of flame, weight or tank level. For example, flame sensors 190 may be situated near the igniters 185 to detect the presence of a flame (See, e.g., FIG. 7). If the flame goes out, the controller 133 may signal an igniter 185 in an attempt to reignite the burner 124. This adds a level of safety protection by reducing problems associated with low flames being blown out. Other sensors (not shown) may detect the weight of a propane tank and display that information on the user interface 132. Other sensors not shown may used to detect the current, voltage or resistance while the igniter 185 is igniting the burner 124.

Additional sensors may comprise electronic temperature transducers (not shown) located inside the cooking chamber 122, on the cooking surface 130 and even inside the food via a probe (not shown). As is well understood in the art, these transducers generate an electrical signal in correlation to the characteristics of the environment and send those signals to the controller. The controller processes the signals and converts them to a numerical value that can be displayed as numbers or graphical indications on the user interface 132. The controller 133 may be configured to logically divide the cooking chamber 122 into individual cooking zones. The desired and actual zone temperatures may be displayed on the user interface 132 for user response and also processed in the controller 133 as part of a control scheme. The zone temperature control may be selectable and adjustable by the user.

Temperature sensing may be accomplished by using any of a number of common devices including Resistance Temperature Detectors (RTDs), Thermistors, IC sensors, radiation sensors, thermometers, bimetallic, IR and thermocouples. A preferred device for measuring temperature is the RTD. RTDs tend to have a slower response time when compared with the more commonly used thermocouples, which are the standard in range hoods. However, RTDs offer several advantages. First, RTDs are relatively inexpensive when used with electronic devices, such as the controller 133. RTDs are inherently stable and have great thermal shock capability which prevents erroneous readings. This is especially important when transporting the grill 110 to a merchant or consumer. A second advantage is that an RTD, unlike a thermocouple, does not need a special compensating lead wire or cold junction compensation. An RTD works by sensing the change in electrical resistance of certain metals in response to temperature increases and decreases. The most commonly used metals for RTDs are platinum, copper, and nickel. These three metals are preferred because they are available in nearly pure form which is important to ensure manufacturing consistency. Furthermore, these three metals offer a very predictable resistance vs. temperature relationship. In fact, the relationship is almost linear. Finally, these metals can be processed into extremely fine wire which is also a desirable trait.

A signal conditioning device called a transmitter can be electrically connected to the sensor. The transmitter converts the sensor signal to an electrical signal recognized by the controller 133. The transmitter electronics can be incorporated into the controller 133 or can be a separate device. Temperature transmitters may be a four-wire, three-wire, or two-wire type, but other methods may be used. The preferred RTD connection method is the four-wire circuit as it eliminates any error caused by mismatched lead wire resistances. In operation, a constant current is passed through each of the leads and the voltage drop across the RTD is measured. With a constant current, the voltage drop is strictly a function of the resistance. This method provides the most accuracy in detecting the temperature at or near the cooking surface 130. The temperature readings can be displayed or processed by the controller for temperature control by controlling gas flow, venting the chamber or turning the fan on or off.

Alternatively, the controller 133 could use fiber optic distributed temperature sensors (DTS). DTS can sense temperatures at multiple points, such as spatial resolution of 1.5 m, along a stainless steel (SS) sheathed fiber and has a resolution of 0.5° C. The fiber can range up to 2,000 m and can be coiled at specific points of interest. The fiber can be sheathed with a nonconductive polymer for intrinsic applications. Using the DTS fiber can provide a multi-point temperature profile of the cooking chamber 122. The fiber can be installed along the front inside edge of the grill 110. Detection response times are shorter and this provides the controller with a complete temperature profile of a target zone rather than just one zone. The fiber also provides the ability to customize the zones by placing additional detection points in alternative areas.

Figure 9:
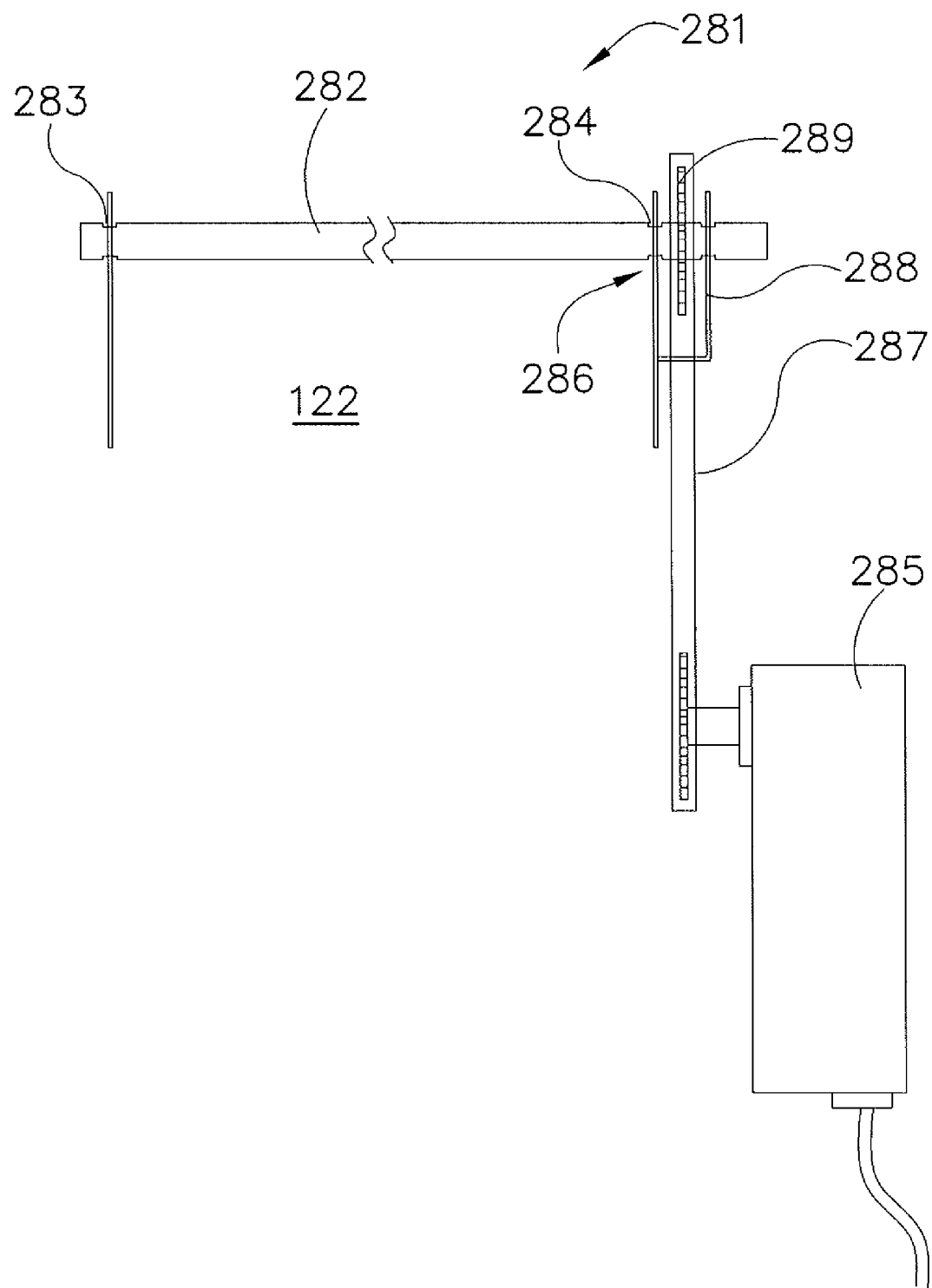

FIG. 9 shows a rotisserie cooking system 281 that can be attached and mounted to sides 120 of the grill 110 in a number of ways known by those skilled in the art. The rotisserie unit or cooking system 281 has a rack 282 with supports 283, 284 at both ends to help distribute the load over more than one surface. During normal operation, the cooking grates 131 would be removed from the cooking chamber 122. The supports 283, 284 prevent the motor 285 from bending or jumping out of the holder 286. The motor 285 is remotely located from the cooking chamber 122. A chain drive 287 turns the rack 282 while a gear cover 288 covers the gears 289. Alternatively, the motor 285 could also be directly coupled to the rack 282.

Figure 15:
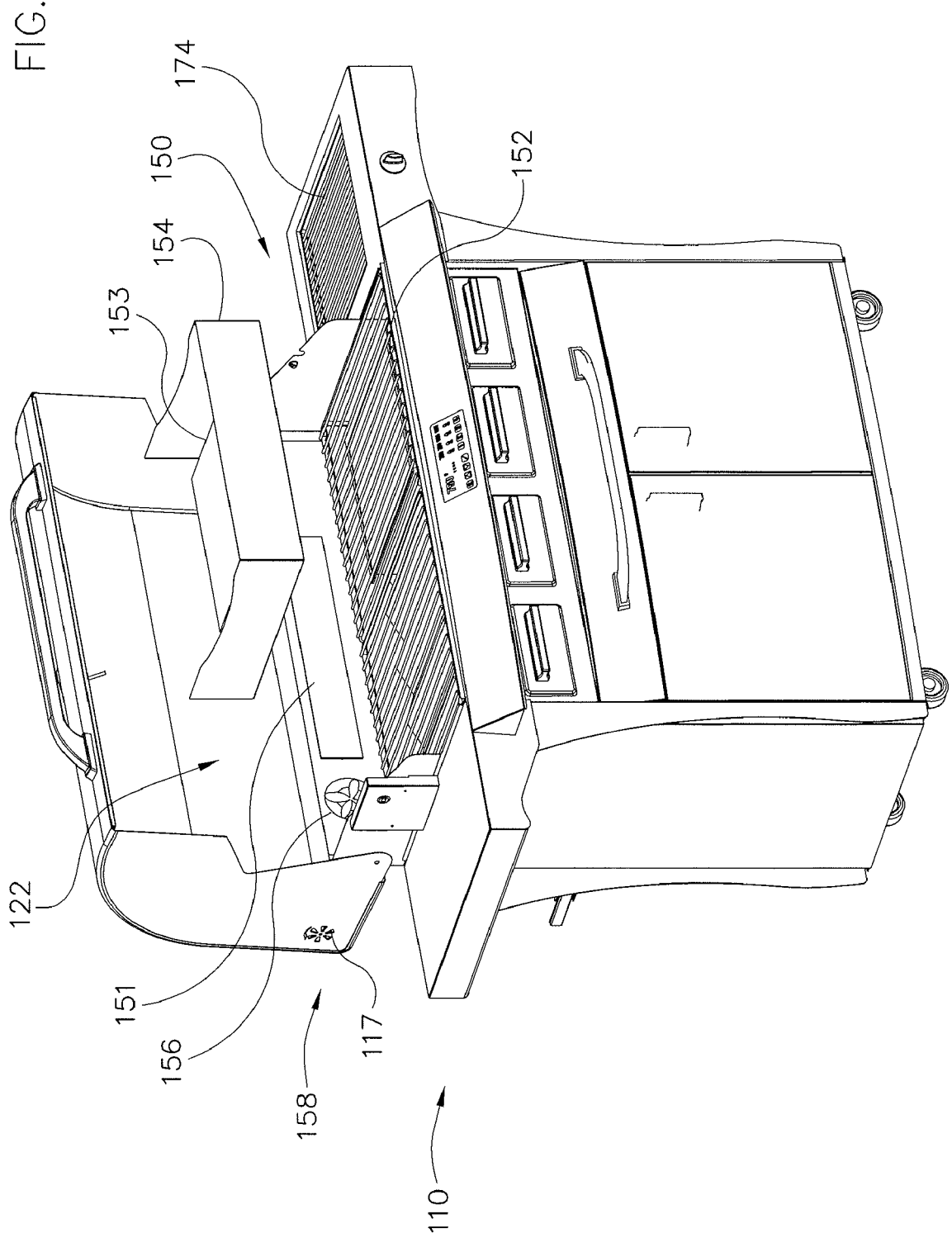

In another embodiment of the grill 110 shown in FIG. 15, a modular IR burner unit 150 is provided. The rear IR burner 151 provides great heating for cooking items on the rotisserie rack 282 (FIG. 9). A bottom IR burner 152 can also be added to the grill 110. The top IR burner 153, supported within housing 154, provides the user with the ability to sear food.

A connection 155 (FIG. 5) on the gas manifold 178 is provided for both the side burner 174 and the IR burner unit 150. The quick-connect system 157 can be a quick-connect type connection 155 where a ring on the female connection is pushed back, the male connecter is inserted, the ring is released which then locks the two connectors together. Having this connection 155 on the manifold 178 permits the user to connect up other products at any time quickly, easily and without the need for tools. The connection 155 having quick-connect fittings could be easily constructed by one skilled in the art.

A ventilation system, 158, e.g., fan 156 and vent 117, (FIG. 15) is situated inside the cooking chamber 122 to provide air movement. The fan 156 provides an even cooking temperature, faster cooking time and air, smoke, and steam circulation around the food item being cooked for better flavoring. The fan 156 can also remove heated air from the cooking chamber 122 to help prevent extremely hot air from reaching the user when lifting the cover. If the grill 110 is used indoors, the fan 156 and vent 117 may be connected as part of an exhaust blower system (not shown).

The grill 110 has an improved ability to weather outdoor temperatures and other environmental conditions due to the lack of mechanical controls, such as burner knobs 32A (FIG. 1) and their respective holes into the grill 110. These holes can act as pathways for environmental hazards such as water, snow, dust, dirt, insects and small rodents. Thus the grill 110 with an electronic touch control 134 and controller 133 preferably has sealing which protects it in outdoor settings. Furthermore, if the controller 133 is located in a location away from the grill, the effects of the environment on the controller, such as cold and moisture can be prevented. Electronic components are more resistant to environmental conditions and problems (unlike mechanical controls and switches which can rust, corrode, become covered in ash or dirt build up and fail).

In another embodiment shown in FIGS. 13A-C and 14A-B, the electronic touch control 134 has the ability to be hidden or covered by a sliding panel, rotating piece, or pop up panel. This ability to conceal the display 137 protecting it from damage or to provide a smooth looking surface can be done by placing the electronic display 137 on a rotating drum or a rotating L shaped plate or on a triangle shaped part in which the display can be shown for operation. Once the operations are done, the user or the controller itself can rotate it to provide a smooth looking surface 136. For example, the user can touch the front of the display for activating movement. Once the electronics sense the pressure on the display 137, the rotation begins until reaching a set stopping point (in this case the stop point would be when the unit provides the smooth surface). Another way the display may move to a closed position is if the electronic touch control 134 and grill 110 have been off for a time. Once a set time has been reached, the electronic touch control 134 returns back to the closed position. A motor or some other mean of rotating the display assembly can be used to provide movement. Switches, stepper motor(s) or magnetism can be used for the location of stop points. Alternatively, the user can press down and manually move the touch control 134 to a closed position. All of these designs can be integrated in to the modular grill 110.

Figure 10A:
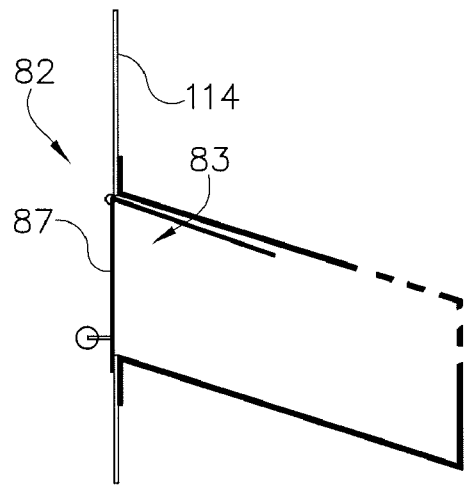
FIGS. 10A-C are side views of a smoke chute for a grill of the present invention demonstrating proper use.
Figure 10B:
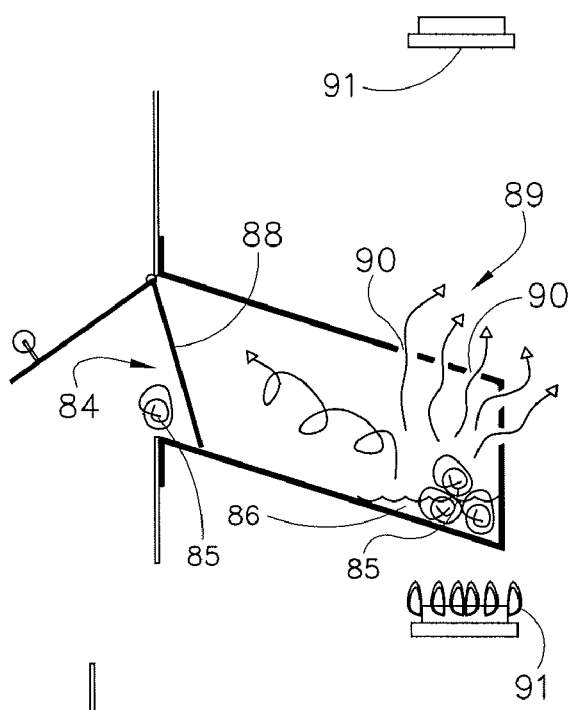
Figure 10C:
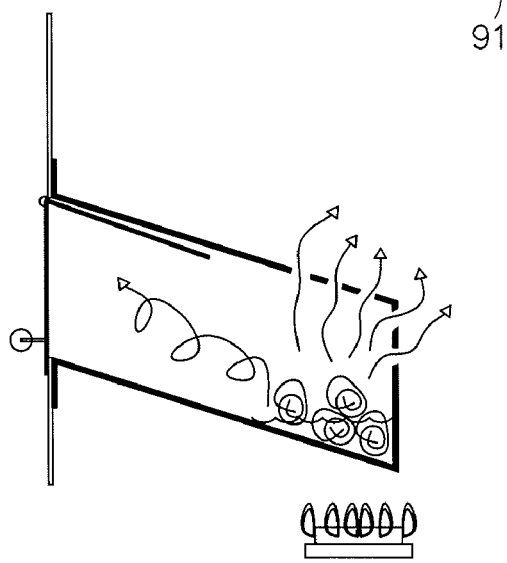

The grill 110 can receive a modular smoke chute 82 added by a user and shown in FIGS. 10A-C. An opening 83 in the grill base housing 114 provides for a port 84 that is found in the opening 83 to add wood 85 or fluid 86 to the chute 82. The chute 82 can be attached to the grill base housing 114 in any number of ways well known in the art. One method includes inserting or snapping the smoke chute 82 in the recess 83 in the base grill housing 114. An access door 87 permits the user to add flavor items such as wood 85 or special liquids 86 which are then heated by a burner 91. When the access door 87 is opened (e.g., FIG. 10A), a back flap 88 seals the chute 82 to prevent exposure to flame, smoke or vapors (e.g., FIG. 10B). Smoke, flavoring, or steam 89 flows through holes 90 located in the smoke chute 82 and is directed into the cooking chamber 122 (e.g., FIG. 10C).

Figure 8:
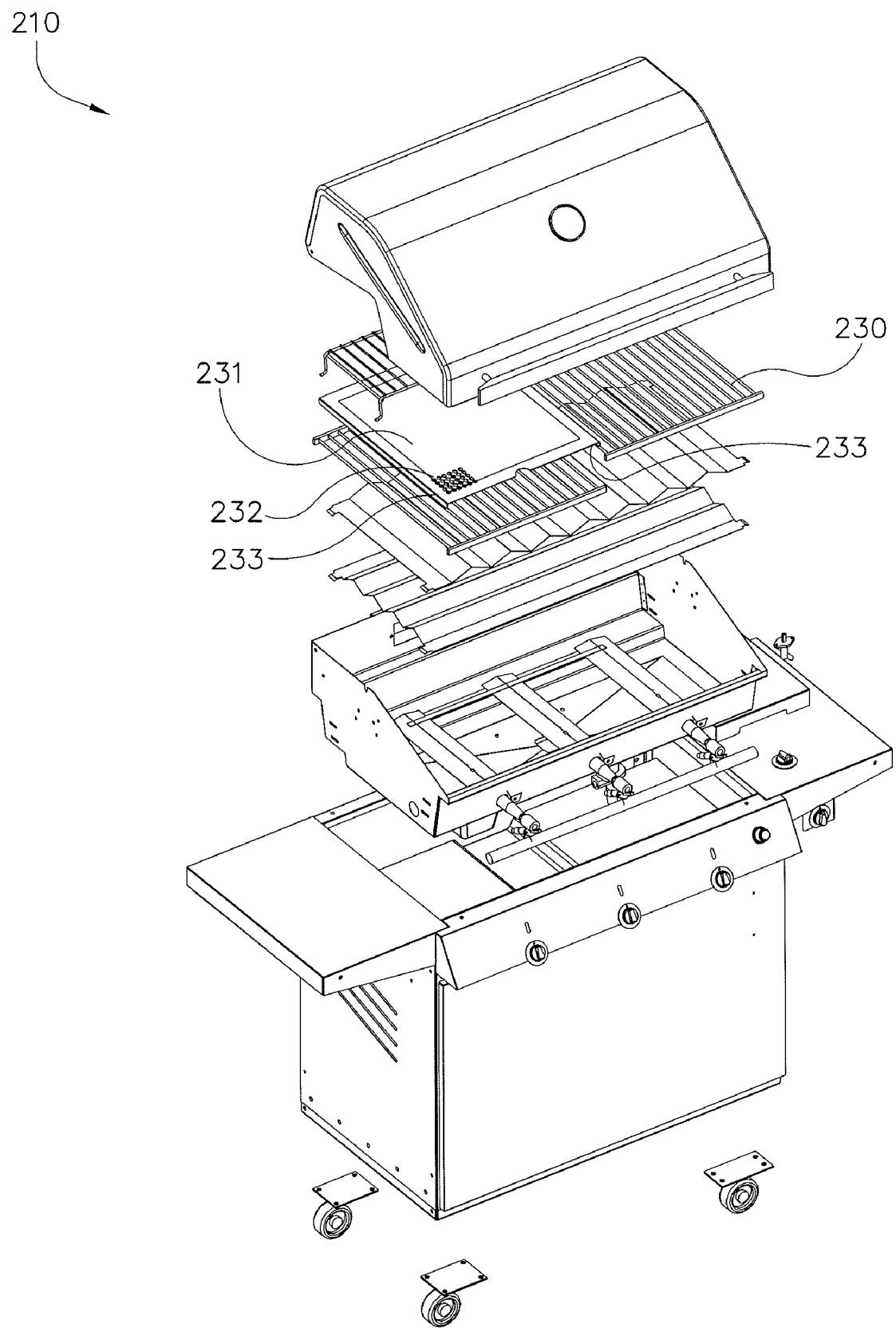

In the embodiment shown in FIG. 8, the grill 210 includes a feature for cooking vegetables with out dropping through the cooking grate 230. Specifically, a stainless steel or porcelain-coated steel veggie plate 231 having small perforations, or holes, 232 is provided such that heated air can pass through the holes 232 to cook the food. The plate 231 sears aesthetically-pleasing marks onto the food. Searing also adds favoring to the items being cooked. The plate 231 has a flange 233 on at least two sides to lock on to the regular cooking grate 230.

In an embodiment not shown, the grill has a saw horse design base with a tank shield in the middle. A user looking at the grill from the front would not be able to see the tank. In this embodiment, heat from the bottom of the grill assembly is deflected away from the tank.

Figure 11:
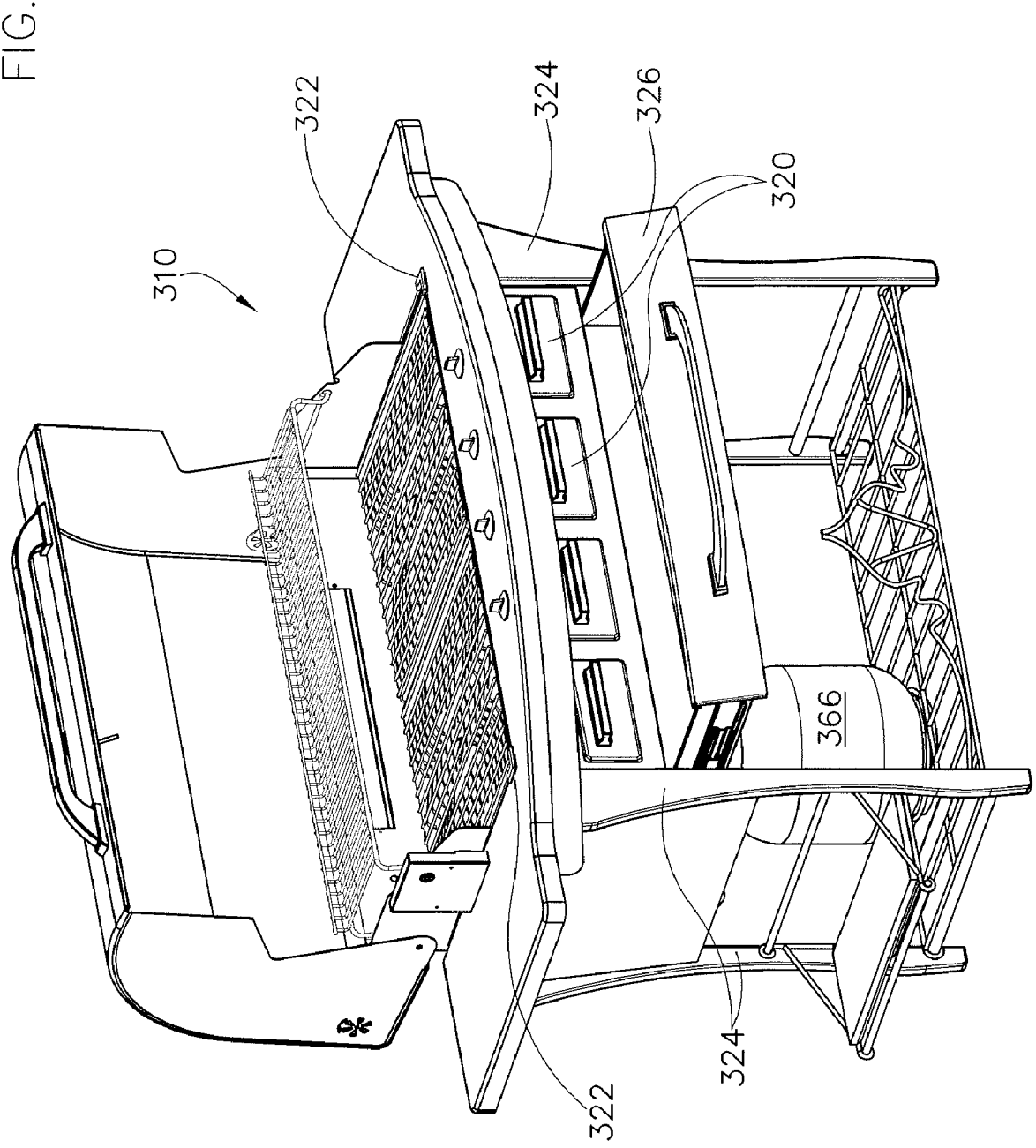

FIG. 11 discloses an alternative embodiment of a grill 310. The grill 310 has solid fuel boxes 320 in addition to burners (not shown). Solid fuel such as charcoal or wood may be used in these boxes 320 and can be manually arranged for desired cooking temperatures. A propane tank 366 is also provided for the burners. A warming drawer 326 is provided. The grill 310 is mounted on a wood frame 324, offset from the grill 310 using bakelite or other thermosetting plastic spacers 322.

FIG. 12 discloses another embodiment of a grill 410. The grill assembly 412 and user interface 432 can be installed on a fixed base 414 such as a cabinet, counter, island or wall. This grill 410 has interchangeable fuel drawers 420 that can be used to alternate between gas and solid fuels. A warming drawer 426 and storage bins 428 are provided as well. Granite 462 or some other suitable material may be provided to cover the fixed base 414.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. In addition, the individual components need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although many elements and components are described herein as physically separate modules, it will be manifest that they may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

We hereby claim:

1. A modular portable grill comprising:
    an enclosure defining a cooking chamber, the enclosure including first pair of opposed sides and a second pair of opposed sides defined generally perpendicular to the first pair of opposed sides;
    a cooking surface operably connected to the enclosure;
    a heating system operably connected to the enclosure, wherein the heating system includes a plurality of burner elements each having a corresponding flame sensor and electronic igniter, and wherein the plurality of burner elements are operative to heat the cooking chamber;
    a monitoring system operably connected to the cooking chamber;
    at least two perforated corrugated plates located between the heating system and the cooking surface, each of the perforated corrugated plates having a length extending between either the first pair of opposed sides or the second pair of opposed sides, and perforations defined along the length of the plates;
    a controller operably connected to the heating system and the monitoring system, wherein the controller divides the cooking chamber into individual heating zones for zone temperature monitoring and control, and further comprising a plurality of temperature sensors, wherein each temperature sensors measures a temperature within a respective heating zone and provides temperature feedback for a respective heating zone to the controller, and wherein the controller causes a display to display the zone temperatures for one or more of the heating zones; and a user interface operably engaged with the controller, wherein the user interface allows a user to set and adjust a desired temperature for each of the heating zones.

2. The modular portable grill of claim 1, wherein sides of the enclosure makes contact with edges of the at least two perforated corrugated plates to provide a seal to force heated air through holes in the plates.

3. The modular portable grill of claim 1, wherein the controller is a microelectronic controller providing at least one of the following: set temperature control, timed on/off control, and zone temperature control.

4. The modular portable grill of claim 1, the user interface further comprising a temperature control knob in operative engagement with a position detection sensor, wherein the sensor detects the position of the knob.

5. The modular portable grill of claim 1, wherein the user interface is an electronic control comprising at least one of a tactile, membrane, piezo, capacitance, resistance-type, induction, and keypad device for operating the grill.

6. The modular portable grill of claim 5, wherein the electronic touch control is mounted on a surface in at least one of the following manners: flush, raised, recessed, hidden and in a pop-up unit.

7. The modular portable grill of claim 1, wherein the grill can be integrated into at least one of a: cabinet, counter, island, wall, and mobile unit.

8. The modular portable grill of claim 7, further comprising an exhaust blower system.

9. The modular portable grill of claim 1, further comprising a fan that provides air movement for at least one of: an even cooking temperature, faster cooking time and smoke circulation.

10. The modular portable grill of claim 1, wherein the user interface is a remote control and the controller is located remotely from the grill.

11. The modular portable grill of claim 1, wherein the controller directs an electronic igniter to reignite a burner element if a corresponding flame sensor detects the absence of a flame.

12. The modular portable grill of claim 11, wherein the flame sensors detect at least one of current, voltage and resistance while the electronic igniters are igniting the burner elements.

13. The modular portable grill of claim 1, wherein the grill can receive at least one of the following modular components: a fan for moving heated air, a smoke chute, a side burner, a rotisserie unit, lighting and an IR burner.

14. The modular portable grill of claim 13, wherein the grill has a quick-connect system for installing the at least one modular components to the gas manifold.

15. The modular portable grill of claim 1, further comprising a rotisserie unit having a motor that turns a rack at a constant speed even when an uneven load is placed on the rack.

16. The modular portable grill of claim 1, further comprising a detachable chute wherein smoke is directed into the cooking chamber to add flavor.

17. A modular portable grill comprising:

a generally rectangular cooking chamber, the cooking chamber defined by a first pair of opposed sides and a second pair of opposed sides defined generally perpendicular to the first pair of opposed sides;

a planar cooking surface disposed within the cooking chamber, the cooking surface having a plurality of openings formed therein to allow the passage of heated air through the cooking surface;

a zonal burner assembly disposed beneath the cooking surface and operative to generate heat in multiple zones defined within the cooking chamber;

a set of perforated corrugated plates located between the zonal burner assembly and the cooking surface, each of the perforated corrugated plates having a length extending between either the first pair of opposed sides or the second pair of opposed sides, and perforations defined along the length of the plates;

a set of temperature sensors disposed within the cooking chamber, each temperature sensor configured to measure a temperature within a respective zone of the cooking chamber;

a controller operably connected to the zonal burner assembly and the set of temperature sensors, wherein each temperature sensors provides temperature feedback for a respective heating zone to the controller, and wherein the controller causes a display to display the zone temperatures for one or more of the heating zones; and a user interface operably engaged with the controller, wherein the user interface allows a user to set a desired temperature for each of the heating zones, and wherein the controller provides commands to the zonal burner assembly to reduce a difference between a measured temperature for a given zone and the desired temperature for the given zone.

18. The modular portable grill of claim 17, wherein the grill is integrated into at least one of a cabinet, a counter, an island, a wall, and a mobile unit.

19. A modular portable grill comprising:

a generally rectangular cooking chamber, the cooking chamber defined by a first pair of opposed sides and a second pair of opposed sides defined generally perpendicular to the first pair of opposed sides;

a cooking surface disposed within the cooking chamber;

a plurality of burner elements adjacently beneath the cooking surface and operative to heat the cooking surface and a volume of air adjacent the cooking surface, each burner element including a flame sensor and electronic igniter;

a monitoring system operably connected to the cooking chamber;

at least two perforated corrugated plates located between the burner elements and the cooking surface, each of the perforated corrugated plates having a length extending between either the first pair of opposed sides or the second pair of opposed sides, and perforations defined along the length of the plates, and wherein sides of the cooking chamber fit against edges of the at least two perforated corrugated plates to provide a seal to force heated air through perforations in the plates;

a controller operably connected to the burner elements and the monitoring system, wherein the controller divides the cooking chamber into individual heating zones for zone temperature monitoring and control, and further comprising a plurality of temperature sensors, wherein each temperature sensor measures a temperature within a respective heating zone and provides temperature feedback for a respective heating zone to the controller, and wherein the controller causes a display to display the zone temperatures for one or more of the heating zones; and a user interface operably engaged with the controller, wherein the user interface allows a user to set and adjust a desired temperature for each of the heating zones.

20. The portable grill of claim 19 further comprising at least one of:

a fan that provides air movement for at least one of: an even cooking temperature, faster cooking time and smoke circulation;

a side burner external to the cooking chamber;

a detachable chute wherein smoke is directed into the cooking chamber to add flavor; and a rotisserie unit having a motor that turns a rack at a constant speed even when an uneven load is placed on the rack.

* * * * *